United States Patent [19]
Robison

[11] Patent Number: 5,805,894
[45] Date of Patent: Sep. 8, 1998

[54] METHOD INSIDE AN OPTIMIZING COMPILER FOR ANALYZING ASSERTIONS AND REDIRECTING CONTROL FLOW IN PROGRAMS

[75] Inventor: Arch D. Robison, Champaign, Ill.

[73] Assignee: Kuck & Associates, Inc., Champaign, Ill.

[21] Appl. No.: 611,739

[22] Filed: Mar. 6, 1996

Related U.S. Application Data

[63] Continuation-in-part of Ser. No. 388,271, Feb. 13, 1995, which is a continuation-in-part of Ser. No. 490,130, Jun. 14, 1995, Pat. No. 5,710,927.

[51] Int. Cl.⁶ .................................................. G06F 9/45
[52] U.S. Cl. ............................................................ 395/709
[58] Field of Search ...................................... 395/709, 708

[56] References Cited

U.S. PATENT DOCUMENTS

| | | | |
|---|---|---|---|
| 5,146,594 | 9/1992 | Iitsuka | 395/708 |
| 5,671,419 | 9/1997 | Carini et al. | 395/709 |

OTHER PUBLICATIONS

"Compilers, Principles, Techniques, and Tools" Aho, Sethi, and Ullman, pp. 681–691 (1986).

"Avoiding Conditional Branches By Code Replication" Mueller, Frank and Whalley, David B., SIGPLAN '95 PLDC, pp. 56–66.

"Propagation of Constants and Assertions," Sakharov, Alexander, ACM SIGPLAN Notices, (1994), pp. 3–6.2.

*Primary Examiner*—James P. Trammell
*Assistant Examiner*—John Q. Chavis
*Attorney, Agent, or Firm*—Brinks Hofer Gilson & Lione

[57] ABSTRACT

A method of analyzing and optimizing programs by predicting branches and redirecting control flow. A program to be analyzed and optimized is inspected to find branches that might be predictable. A set of assertions is generated, analyzed by a dataflow solver and then used to predict the effects of branches. Control flow in the program is redirected to skip over predictable branches. The dataflow solver is capable of analyzing assertions involving lvalues such as variables, pointer expressions, or components of aggregate lvalues.

7 Claims, 15 Drawing Sheets

FIG. 1A
```
L1:
{
    INT z;
    IF ( x > a ) {
        z = (y>=b);
    } ELSE {
        z = 0;
    }
    IF ( z==1 ) {
        L2: ...
    }
}
L3: ;
```
FIG. 1B
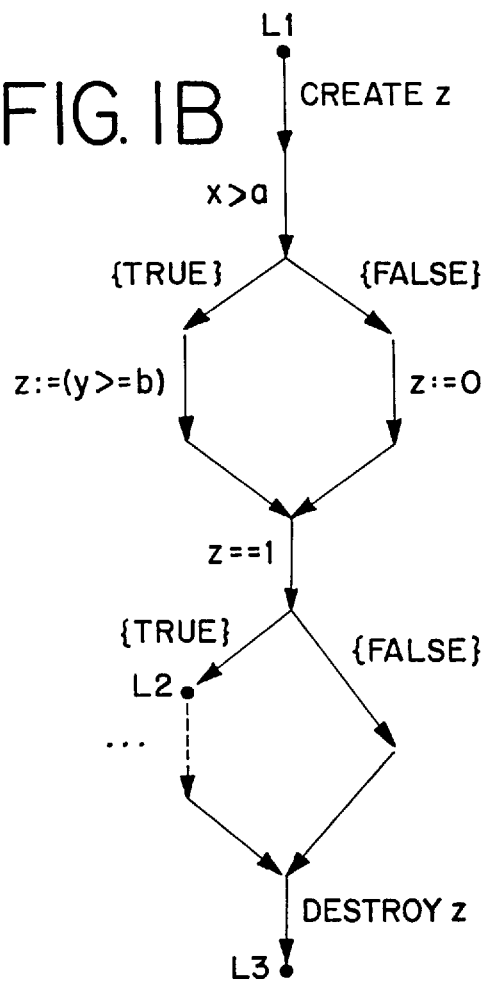
FIG. 2A
```
L1:
SWITCH (x+c) {
    CASE 5:
        w=a-b;
        x=0;
        BREAK;
    CASE 4:
    CASE 8:
        BREAK;
    DEFAULT:
        w=5;
        BREAK;
}
L2:
```
FIG. 2B
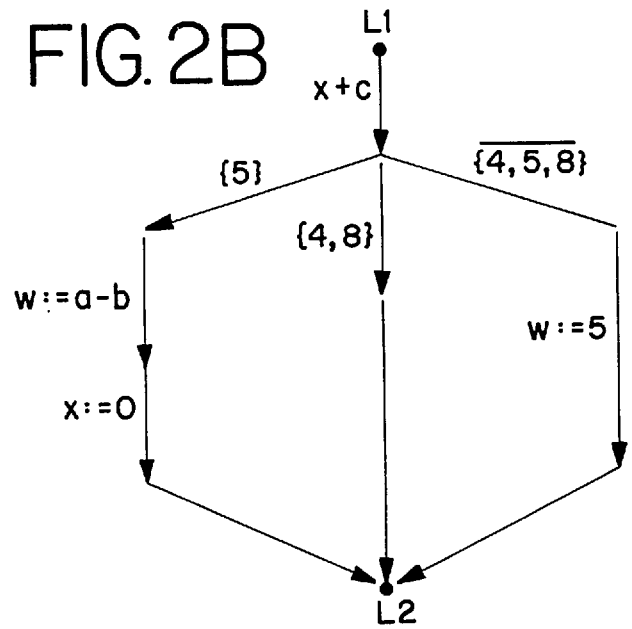

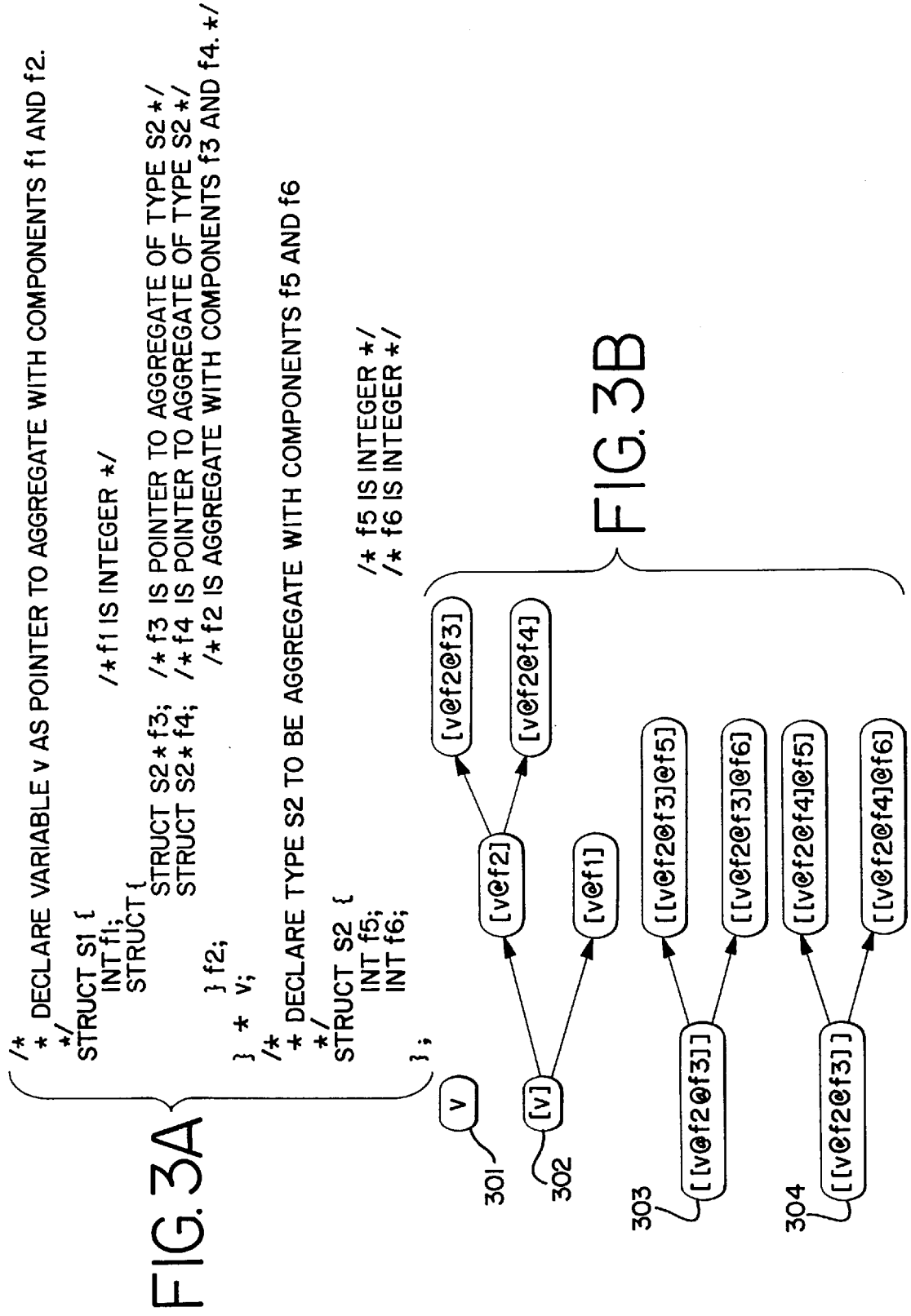

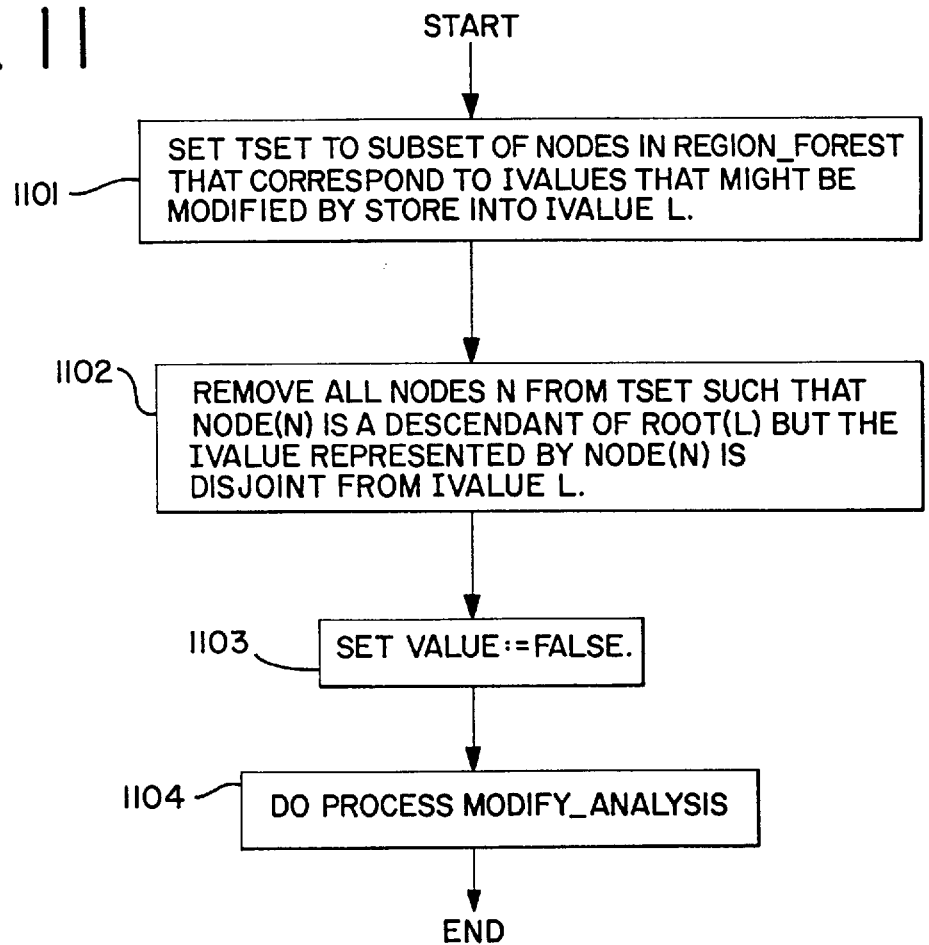
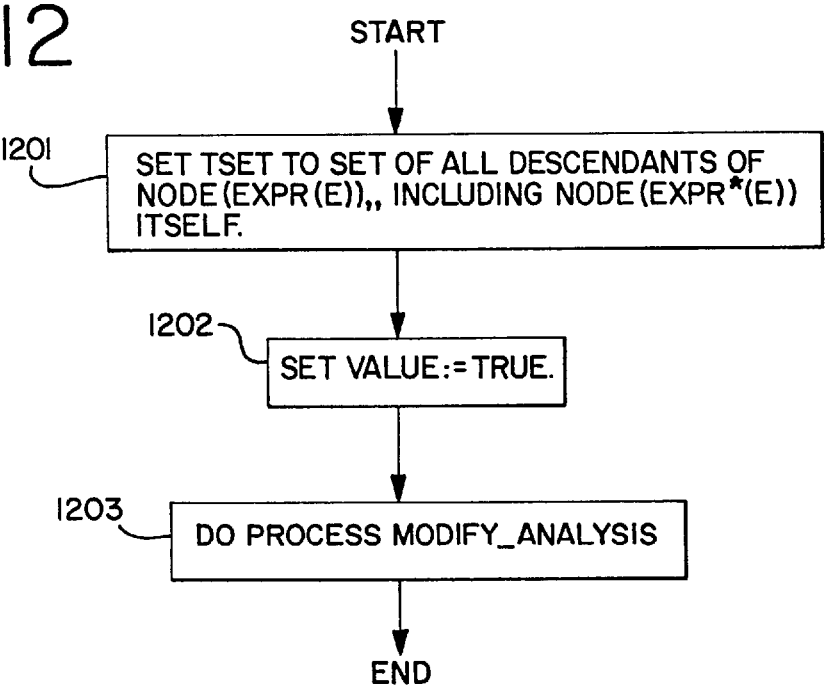

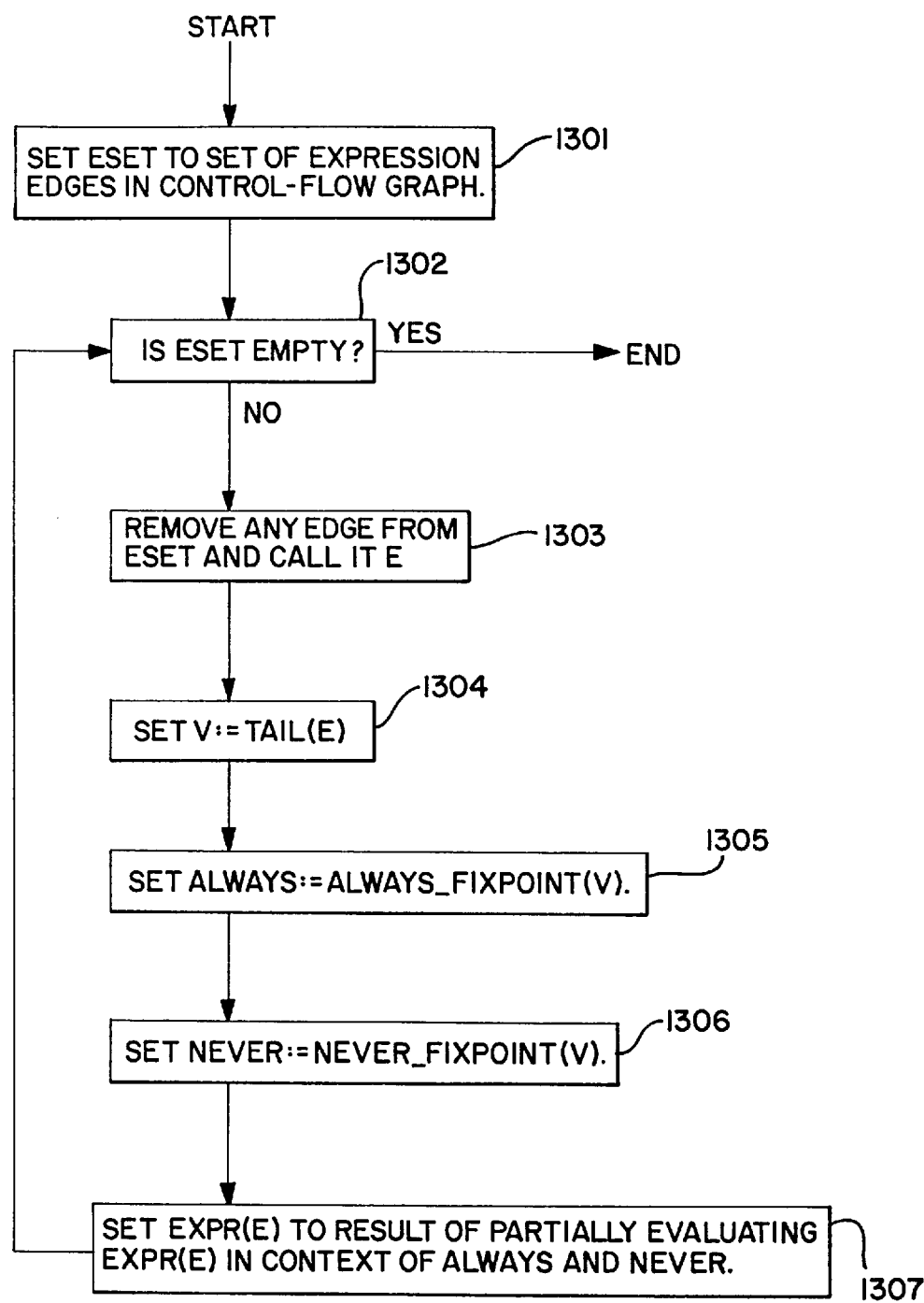

FIG. 16A
```
STRUCT {
    FLOAT a, b, c;
} * p;
...
IF(p->a < p->c) {
    x = 42;
}
p->b = x;
IF(p->c <= p->a) {
    x = x+1;
}
```
FIG. 16B
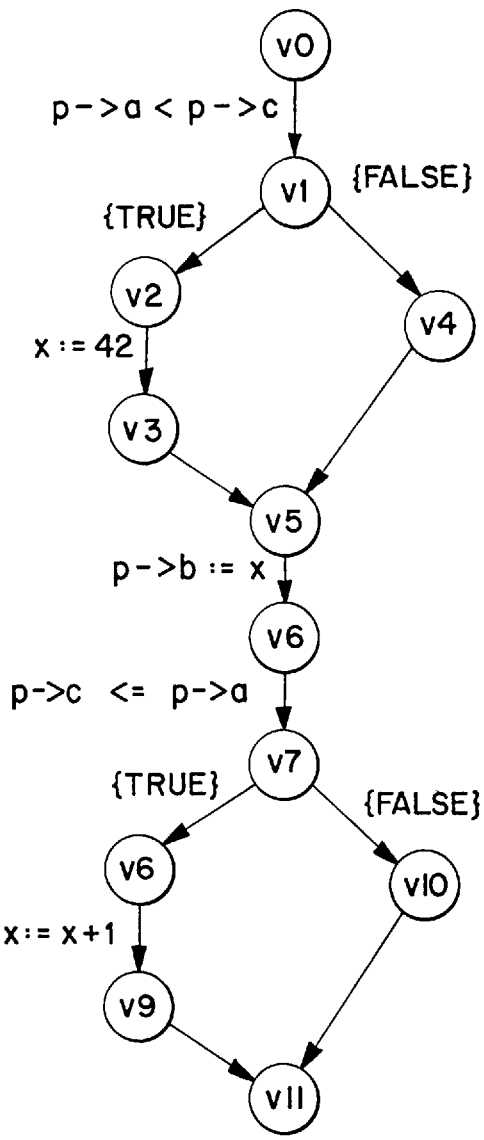
FIG. 17B
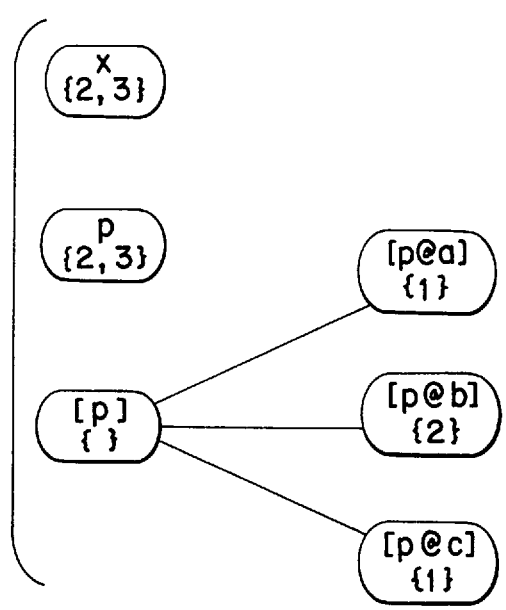
FIG. 17A
```
ASSERTION_SET(1) == "p->a < p->c"
ASSERTION_SET(2) == "x == 42"
ASSERTION_SET(3) == "p->b == x"
```

METHOD INSIDE AN OPTIMIZING COMPILER FOR ANALYZING ASSERTIONS AND REDIRECTING CONTROL FLOW IN PROGRAMS

CROSS-REFERENCES TO RELATED APPLICATIONS

This application is a continuation-in-part of co-pending applications Ser. No. 08/388,271, filed Feb. 13, 1995, pending and Ser. No. 08/490,130, filed Jun. 14, 1995, now U.S. Pat. No. 5,710,927, assigned to the present assignee, the contents of which are incorporated herein by reference.

A Microfiche Appendix consisting of 1 sheet (93 total frames) of microfiche is included with this specification, the contents of which are incorporated herein by reference. The Microfiche Appendix contains material which is subject to copyright protection. The copyright owner has no objection to the facsimile reproduction of the Microfiche Appendix, as it appears in the Patent and Trademark Office patent files or records, but otherwise reserves all copyright rights whatsoever.

TECHNICAL FIELD

The present invention generally relates to software compiler technology. More particularly, the present invention relates to a method for inserting unconditional jumps into a program in order to remove points where control flow merges and subsequently branches.

There are two distinct benefits of such replacement. First, computers usually execute the unconditional jump more quickly than the branch that was replaced. Second, and more importantly, removing a merging path from the control flow of a program generally improves the effect of other analyses and transformations on the program.

BACKGROUND INFORMATION

Two notions in programming languages are lvalues and branches. An lvalue is an assignable program entity such as a variable, target of a pointer, or (recursively) component of an aggregate lvalue. A branch is a program construct in which program execution chooses one of two or more alternatives based upon evaluation of a controlling expression.

Mueller and Whalley describe a means of transforming a program in order to avoid conditional branches. Their method examines loops within a program. For each loop, their method looks at possible paths through the loop, and if one or more of the possible paths do not affect a conditional branch, their method restructures the program such that the conditional branch is not executed along those paths. Their method is restricted to loops and does not use flow analysis.

Sakharov describes the state of the art in assertion propagation. His method propagates assertions of "equals" and "not equals" using flow analysis on scalar variables and redirects control-flow past branches. His method does not address propagation of more complicated assertions such as "greater" or "less". His method redirects control-flow around only a single branch, and cannot redirect control-flow around more general combinations of branches and side-effects.

Neither the method of Mueller and Whalley nor the method of Sakharov consider any of the the following aspects:

branchs that have more than two alternatives;

lvalues more general than scalar variables; and the lifetimes of lvalues.

Consequently, they give up on opportunities to redirect control flow when analysis of one or more of the said constructs is necessary. Thus, for example, the said methods fail to fully consider the following features in the programming language C:

multiway branches in the form of switch statements;

structures, unions, arrays, and indirect references via pointers, all of which specify lvalues that are not scalar variables; and automatic variables whose lifetime is limited to execution of a block.

Most modern programming languages have equivalent constructs.

SUMMARY OF THE INVENTION

It is an object of the invention to redirect control flow around a combination of one or more branches and any intervening side effects, if the effects of executing the branches after reaching certain points in the program can be predicted when the program is compiled.

It is an object of the invention to transform programs so that flag variables are removed and replaced by equivalent branching.

It is an object of the invention to gather information on assertions based on flow-analysis of lvalues more general than (but also including) variables within a program.

It is an object of the invention to use information about the lifetimes of lvalues when analyzing assertions.

It is an object of the invention to perform flow analysis on aggregate lvalues referenced via pointers more accurately than in prior art.

These and other features and advantages of the invention will become apparent upon a review of the following detailed description of the presently preferred embodiments of the invention, taken in conjunction with the appended drawings.

BRIEF DESCRIPTION OF THE DRAWINGS

FIG. 1A shows an example C program and FIG. 1B shows its corresponding control-flow graph.

FIG. 2A shows an example C program and FIG. 2B shows its corresponding control-flow graph.

FIG. 3A is a C declaration and FIG. 3B shows its corresponding region-forest.

FIG. 11 is a flowchart for process STORE_IMPLICATION, which records the effect of store into lvalue L on vectors ALWAYS and NEVER.

FIG. 12 is a flowchart for process LIFETIME_IMPLICATION, which records the effect of creation or destruction of lvalue L on vectors ALWAYS and NEVER.

FIG. 13 is a flowchart of the steps for simplifying program expressions via information gathered from flow analysis.

FIG. 16A is an example C program and FIG. 16B shows its corresponding control-flow graph.

FIG. 17A shows the elements of ASSERTION_SET and FIG. 17B shows the region-forest for the example in FIG. 16.

DESCRIPTION OF THE PREFERRED EMBODIMENT

Figure 5:
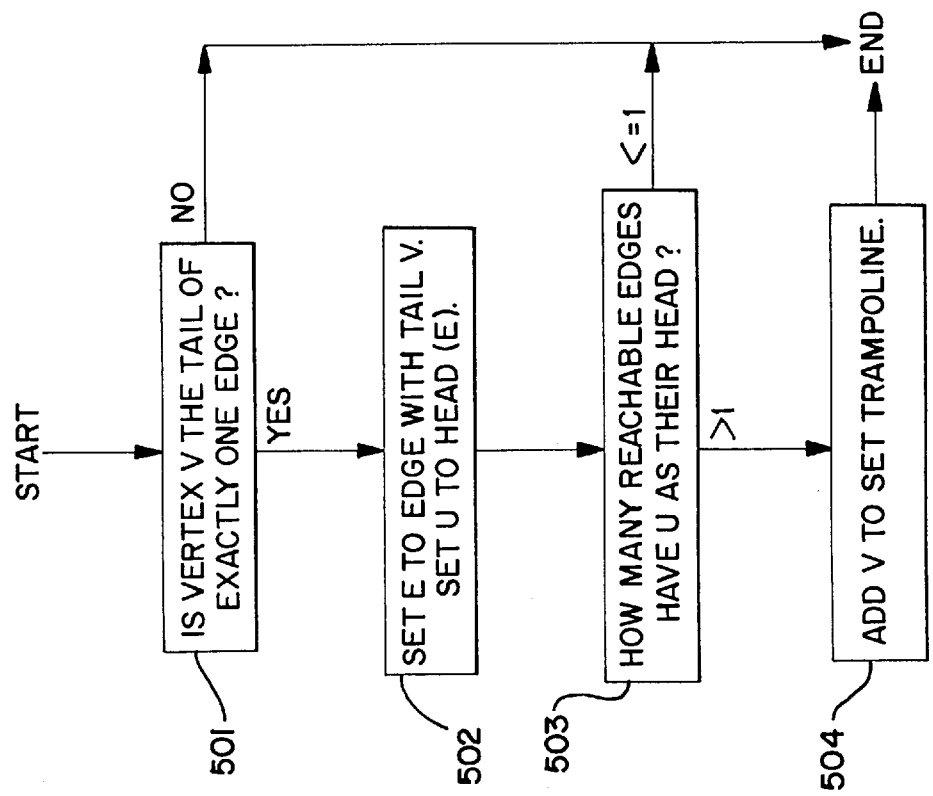
FIG. 5 is a flowchart for process DECIDE_TRAMPOLINE.

To avoid confusion as to whether the equals symbol (=) denotes assignment or comparison, the description uses the symbol := to denote assignment and the symbol == to denote comparison for equality. The symbol = is used only in literal examples for the programming language C. For similar reasons, the description uses the C notations !=, <=, and >= to mean, respectively, comparisons for inequality, less-than-or-equals, and greater-than-or-equals. These symbolic conventions are for description only. The invention itself is generally applicable to programming languages other than C.

A boolean expression is an expression that evaluates to true or false. The representation chosen for true or false is irrelevant to the invention.

The preferred embodiment employs a control-flow graph representation of a program in which edges of the graph represent transfer of control and evaluation of expressions. Each edge in the graph has a unique tail vertex and a unique head vertex. The head of an edge E is denoted HEAD(E). The tail of an edge E is denoted TAIL(E). An edge E with tail U, and head V is denoted U→V. Vertices correspond to points of execution between actions. This kind of control-flow graph departs from common practice primarily in that side-effects are represented as edges instead of vertices.

FIG. 1A shows an example program in the programming language C and FIG. 1B shows the corresponding control-flow graph. Notice that the controlling expression "if(x>a)" in the program becomes three edges in the control-flow graph: one for the evaluation of the expression "x>a", and two more corresponding to taking the "true" and "false" arms of the if-then-else.

An edge is reachable if program execution might execute the corresponding action. There are well-known means in the art for identifying unreachable edges. An embodiment of the invention can simply choose to remove all unreachable edges, or simply mark them as unreachable. If a vertex is the tail of more than one reachable edge, it is called a branch point. If a vertex is the tail of no reachable edge, it is called a terminal point. If a vertex is the head of more than one reachable edge, it is called a merge point.

There are four kinds of edges: branch, jump, lifetime, and expression edges. A branch edge is an edge with a branch point for its tail. A branch edge E is always labeled with a set of constants denoted LABEL(E). The set of constants contains a constant C if and only if that branch edge is taken when the branch test evaluates to C. For branch edges that share a common tail, for every constant C that the test expression might evaluate to, there is exactly one branch edge E such that LABEL(E) contains C. A jump edge represents unconditional transfer of control with no changes. A lifetime edge represents creation or destruction of an lvalue. The lvalue associated with the lifetime edge is denoted EXPR(E). A expression edge is an edge associated with evaluation of an expression. The expression associated with edge E is denoted EXPR(E), and may have side-effects. The expression may correspond to an expression in a high-level language, or may correspond to a machine instruction.

If an edge E has a branch vertex as its head, the edge is an expression edge, and EXPR(E) represents the expression that controls which branch is taken. There may be more than two branch edges with a common tail. FIG. 2A shows an example C switch statement and FIG. 2B shows the corresponding control-flow graph that has three branch edges (labeled {5}, {4,8} and $\overline{\{4,5,8\}}$) that share a common tail (labeled L2).

The control-flow graph should be constructed such that merge points are heads of jump edges and not other kinds of edges. A method of satisfying this restriction is to insert a jump edge between the head of an edge and a merge point. Note that this implies that a vertex cannot be both branch vertex and a merge vertex, since a branch vertex is always the head of an expression edge.

An rvalue is a value (bit-pattern). An rvalued expression is an expression that, when evaluated, yields an rvalue. An lvalue is a region of memory (or register) denoted by a program variable, a pointer rvalue, or component of an "aggregate lvalue". An aggregate lvalue is a region of memory that can be manipulated as a single entity or manipulated as a collection of components, where each component is an lvalue. A component of an aggregate lvalue may be an aggregate itself. Examples of aggregate lvalues in the programming language C are arrays, "structs", and "unions". Examples of aggregate lvalues in the programming languages Ada and Pascal are records and arrays. Examples of aggregate lvalues in the programming language FORTRAN-90 are structures and arrays. Distinct components of an aggregate need not correspond to distinct regions of memory, as is the case, for example, for components of a "union" in C. The invention applies to similar constructions in other programming languages.

The contents of an lvalue are an rvalue. An lvalued expression is an expression, that when evaluated, yields an lvalue. A pointer rvalue is an rvalue that "points" to an lvalue. Each lvalue has a unique pointer rvalue, though many different expressions may evaluate to that rvalue. Some expressions can be both rvalued and lvalued, depending upon context. For example, in the statement $$J:=J+1$$

the J on the left-hand-side denotes an lvalue that is stored into. The J on the right-hand-side denotes an lvalue from which is loaded an rvalue.

The following notations are used for descriptive purposes. For an rvalue P that points to an lvalue, the notation [P] denotes the lvalue designated by rvalue P. For an rvalue P that points to an aggregate of a type with a component F, the notation P@F denotes a pointer to the component within the aggregate pointed to by P. The operator @ is left-associative; thus, P@F@G denotes a pointer to component G of component F of the aggregate pointed to by P. Notice that in this case P@F denotes a pointer to a component that is itself an aggregate. The notation [P] corresponds to (*P) in the programming language C. The notation P@F corresponds to (&(*P).F) in the language C. The notation described in this paragraph is not part of the invention, but merely simplifies discussion of it. In particular, the notation P@F is intended to convey the notion that P@F is a pointer computed by adjusting pointer P, whereas the C notation (&(*P).F) introduces a redundant indirection (*P) that is canceled by the C address-taken operator &.

A definition is the assignment of a right-hand-side rvalue to a left-hand-side lvalue. The support of an rvalued expression E is denoted as SUPPORT(E), and is the set of mutable lvalues that are loaded from when the expression E is evaluated. An lvalue is mutable if it can possibly have more than one value assigned to it during program execution. The support of an lvalue is the support of the pointer expression that designates the rvalue, or the empty set if the lvalue cannot be specified by a pointer expression. E.g., "register variables" in the programming language C. For example, consider the definition below.

$$[[v1@f2@f3]@f5]:=[[v2@f2@f4]@f6]+3.14$$

1. The left-hand-side lvalue is "[[v1@f2@f3]@f5]".
2. The rvalue designating that lvalue is "[v1@f2@f3]@f5".
3. The right-hand-side rvalue is [[v2@f2@f4]@f6]+3.14".
4. The support of the left-hand-side lvalue is the set {v1,[v1@f2@f3]}
5. The lvalue [[v1@f2@f3]@f5] is not part of the support, since it is stored into, not loaded from.
6. The support of the right-hand-side rvalue is the set {v2,[v2@f2@f4], [[v2@f2@f4]@f6]}

The support of an rvalue may be empty. For instance, the support for an rvalued expression E is empty if expression E contains no loads from mutable lvalues. For example, the constant "3.14" is an rvalue that contains no loads from mutable lvalues.

The preferred embodiment employs a data-structure called a region-forest. A region-forest is a set of region-trees. A region-tree is a tree structure that represents an lvalue and its (recursive) decomposition into component lvalues. Each node in a region-tree, called a region-node, corresponds to an lvalue. A region-forest need not contain representations for all lvalues. For each lvalue L, the corresponding region-node in a region-forest is denoted NODE(L). If an lvalue L is not represented in a region-forest, then NODE(L) yields a special value NULL that is not a node in the forest.

Each region-tree has a root node, which has no parent node. Each non-root node has a single parent node. The parent of NODE(L) corresponds to the innermost aggregate that properly contains the lvalue L. In other words, if a region-node NODE(M) corresponds to an aggregate lvalue M, then the children of NODE(M) correspond to the components of lvalue M. The root node of a region-tree has no parent, and corresponds to an lvalue that is not a component of any lvalue. Given an lvalue L, the root node of the region-tree that denotes its outermost containing lvalue is denoted ROOT(L). Notice that for any pointer P with component F, the following is always true: ROOT([P])=ROOT([P@F]). It follows that if a scalar lvalue is not a component of any lvalue, then the corresponding region-tree is always a trivial tree consisting of only a root node.

A node A is an "ancestor" of a node D if a node A is the same node as a node D or (recursively) node A is the parent of an ancestor of node D. Similarly, a node D is a "descendant" of node A if node D is the same node as node A or (recursively) a child of a descendant of node A. Notice that a node is considered to be both an ancestor and descendant of itself. The "nearest common ancestor" of two nodes X and Y, if it exists, is the node that is an ancestor of both X and Y and has no child that is also an ancestor of both X and Y.

A region-forest need not represent all lvalues or components of an lvalue; it can represent only some components of an lvalue if only those components are of interest. For example, if an lvalue [P] has components [P@F] and [P@G], the corresponding region-tree can omit the nodes corresponding to either or both of the components. A point not to be overlooked in a correct embodiment is that since a region-tree need not represent all components of an lvalue, there can be one or more component lvalues L such that ROOT(L) exists but NODE(L) does not. That is, the outermost containing lvalue of a component can be represented as a node in the tree without necessarily representing the component as a node in the tree. Not representing all lvalues in a region-tree is an essential part of making the preferred embodiment efficient. For example, if a program declares an array A with N elements, but references only the first element, the region-tree need only contain 2 nodes: a node for A and a node for the first element of A. If all elements were represented, it would require N+1 nodes: a node for A and a node for each of the N elements.

FIG. 3A shows a declaration of a variable v in the programming language C and FIG. 3B shows the correponding region-forest for the lvalues pointed to by the address of v (one-node tree rooted at 301), v itself (tree rooted at 302), [v@f2@f3] (tree rooted at 303), and [v@f2@f4] (tree rooted at 304). An essential point of the invention is that the lvalue corresponding to the root need not be a pointer variable, but may be designated by an arbitrary expression, as demonstrated in the example by the trees corresponding to the lvalues [v@f2@f3] and [v@f2@f4]. A point to be emphasized is that the tree for the lvalue pointed to by v is distinct from the trees for the lvalues pointed to by [v@f2@f3] and [v@f2@f4]. Each tree represents the decomposition of an lvalue, not an indirection chain of pointers. Distinct indirection chains are represented by different trees.

Figure 4:
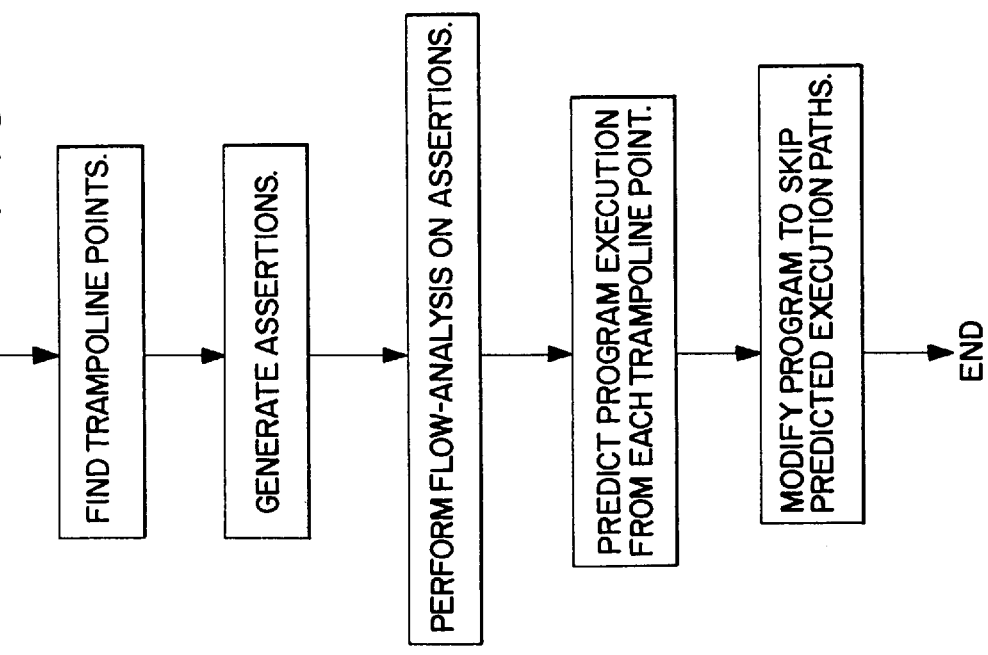
FIG. 4 is an overview of the invention.

FIG. 4 gives an overview of the present invention. The invention applies to a program in control-flow graph form. The steps that comprise the present invention are as follows.

Figure 6:
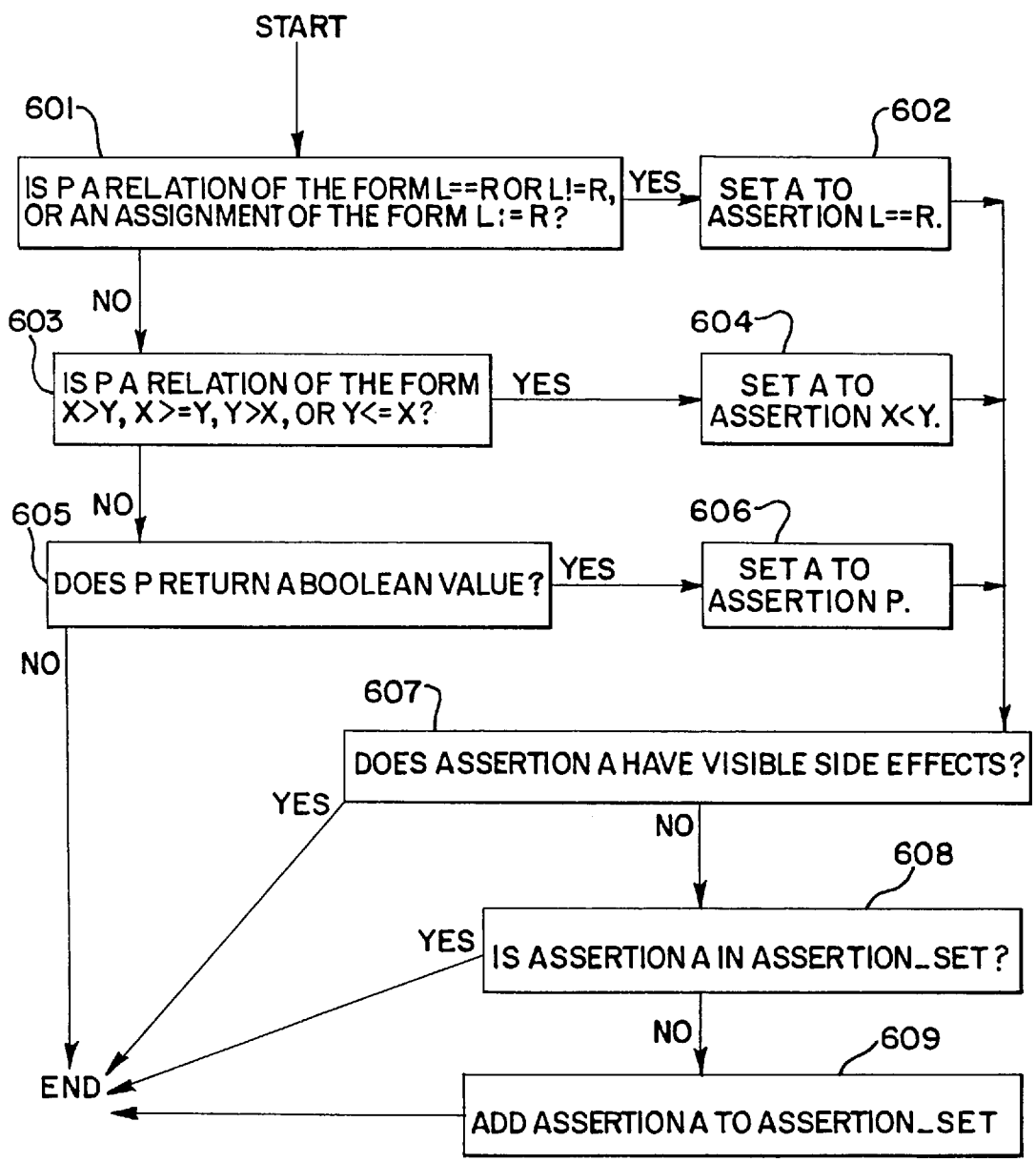
FIG. 6 is a flowchart for process GENERATE_ASSERTIONS for generating assertions from an expression or subexpression P.

1. Find trampoline points. Begin by setting set TRAMPOLINE to the empty set. Then for each vertex V in the control-flow graph, apply the process DECIDE_TRAMPOLINE shown in FIG. 5. If 501 vertex V is the tail of exactly one edge, then edge E is set to that edge and U is set to HEAD(( )E) 502. If 503 U is the head of more than one edge, then vertex V is added 504 to set TRAMPOLINE.
2. Generate assertions to prove. An assertion is an expression that returns true or false. Begin by setting set ASSERTION_SET to empty. For each expression edge E, examine each expression or subexpression within EXPR(E) and call it P. For each P, perform the following steps (FIG. 6)
    (a) If 601 P is an assignment of the form L:=R, or a relation of the form L==R or L!=R, then set 602 A to the assertion L==R. Here L and R stand for arbitrary expressions. In the assignment case, L can be an arbitrary lvalue.

(b) Else if 603 P is a relation of the form X<Y, X>=Y, Y>X, or Y<=X, then set 604 A to the assertion X<Y. Here X and Y stand for arbitrary expressions.

(c) Else if 605 P is a boolean expression, and none of the said steps defined an assertion A for it, then set A 606 to expression P.

If any of the above steps define assertion A and assertion A does not 607 contain side-effects, and it is not 608 already present in ASSERTION_SET, then add 609 it to set ASSERTION_SET.

The kth assertion in ASSERTION_SET is denoted ASSERTION_SET(k).

Figure 7:
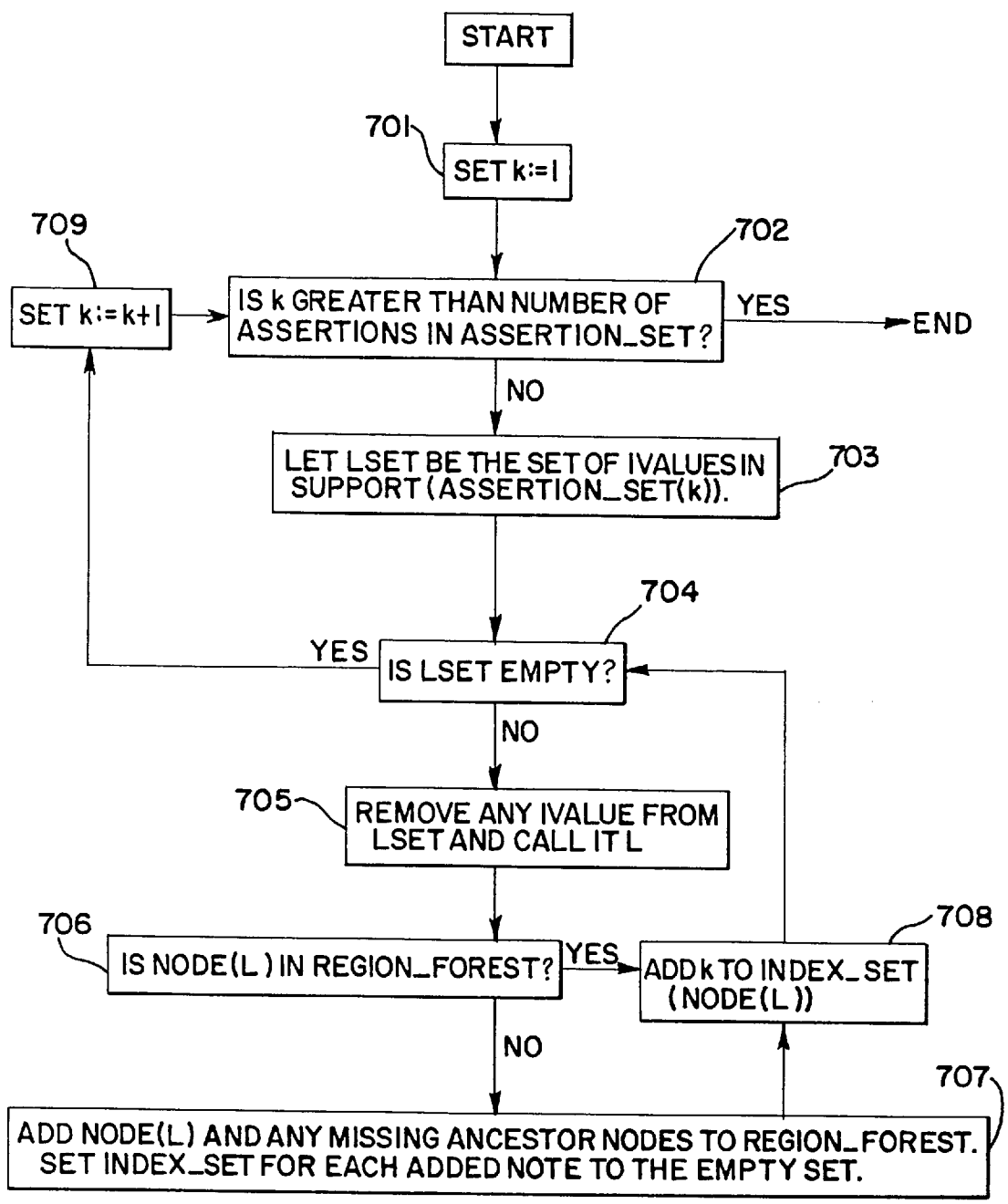
FIG. 7 is a flowchart for process BUILD_REGION_FOREST, which builds the region-forest REGION_FOREST.

3. Construct region-forest REGION_FOREST for analyzing assertions and the associated index sets. Associated with each node N in REGION_FOREST is a set of indices denoted INDEX_SET(N). Index k corresponds to assertion ASSERTION_SET(k). Begin by setting REGION_FOREST to a forest containing no trees. Do the process BUILD_REGION_FOREST as shown in FIG. 7. This process iterates (701,702,709) over the assertions in ASSERTION_SET, and iterates (703,704,705) over the lvalues in each such assertion. For each such lvalue L, it inspects 706 whether forest REGION_FOREST has a node representing L, and if not, adds 707 a node (and any missing ancestors) for lvalue L to the forest. Furthermore, this process adds 708 index k to set INDEX_SET(NODEL). Thus after the region-forest is constructed, INDEX_SET (NODEL) contains integer k if the support for assertion ASSERTION_SET(k) contains lvalue L.

Figure 8:
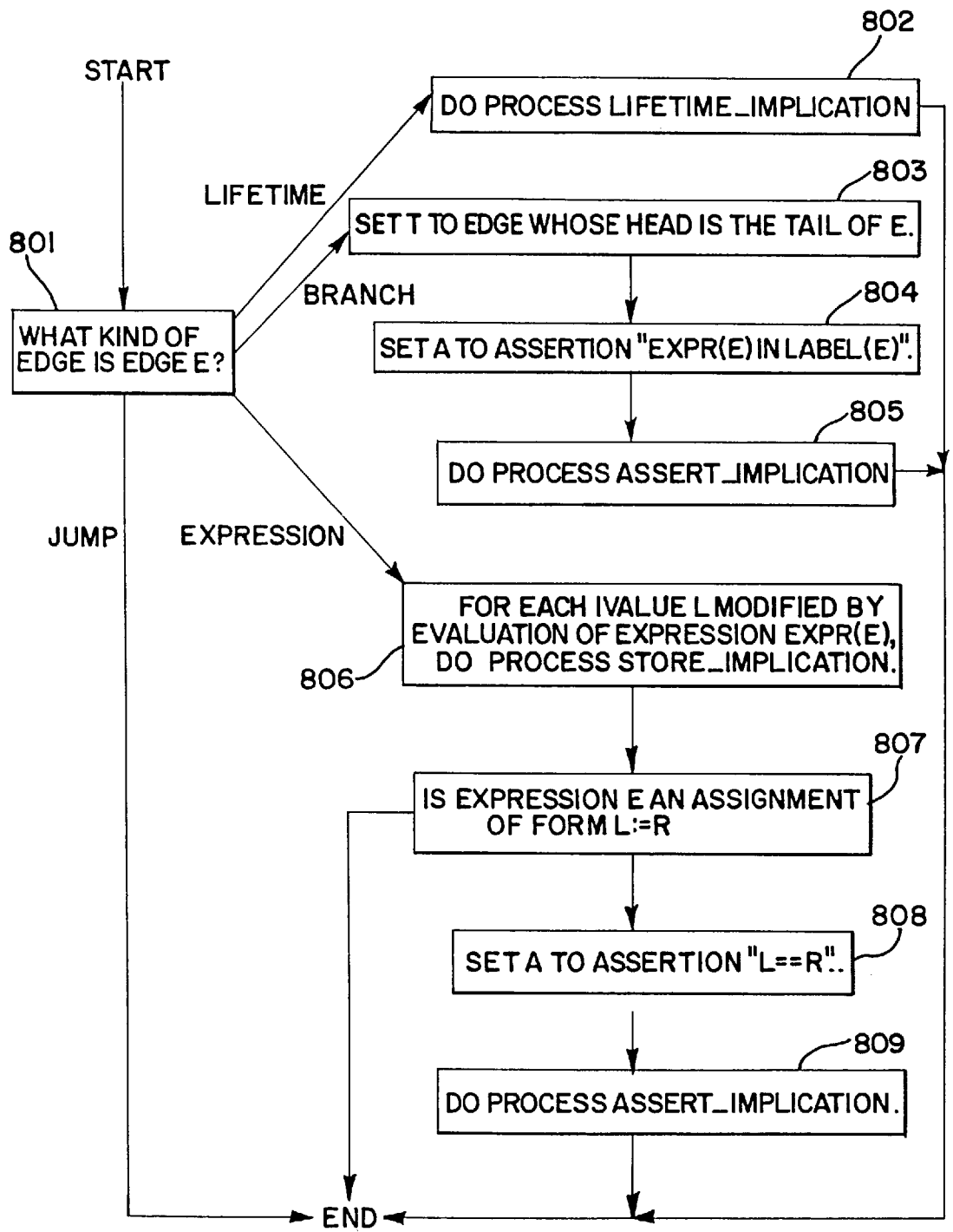
FIG. 8 is a flowchart for process EDGE_IMPLICATION, which computes the effect of executing edge E on vectors ALWAYS and NEVER.

4. Define transfer-functions for proving the assertions in ASSERTION_SET. Each edge in the control-flow graph is associated with a transfer function IMPLICATION(E). The function IMPLICATION(E) is implemented as a process EDGE$_{13}$ IMPLICATION that takes two boolean arrays ALWAYS and NEVER as input, and modifies zero or more elements thereof as shown in FIG. 8. The resulting arrays are the output of the function.

The boolean arrays ALWAYS and NEVER each have n bits, where the kth bit in each corresponds to ASSERTION_SET(k). These bits are denoted ALWAYS(k) and NEVER(k). Each bit is either true or false.

Process EDGE_IMPLICATION (FIG. 8) inspects 801 edge E and takes an action depending upon the kind of edge.

(a) If edge E is a jump edge, do nothing.

(b) If edge E is a branch edge, set elements of arrays ALWAYS and NEVER to reflect what must be true for branch edge E to be taken. Do this via the following steps:

(i) Set 803 T to the edge such that HEAD(T)==TAIL(E).

(ii) Set 804 A to be the assertion "Is EXPR(T) in LABEL(E)?".

Figure 9:
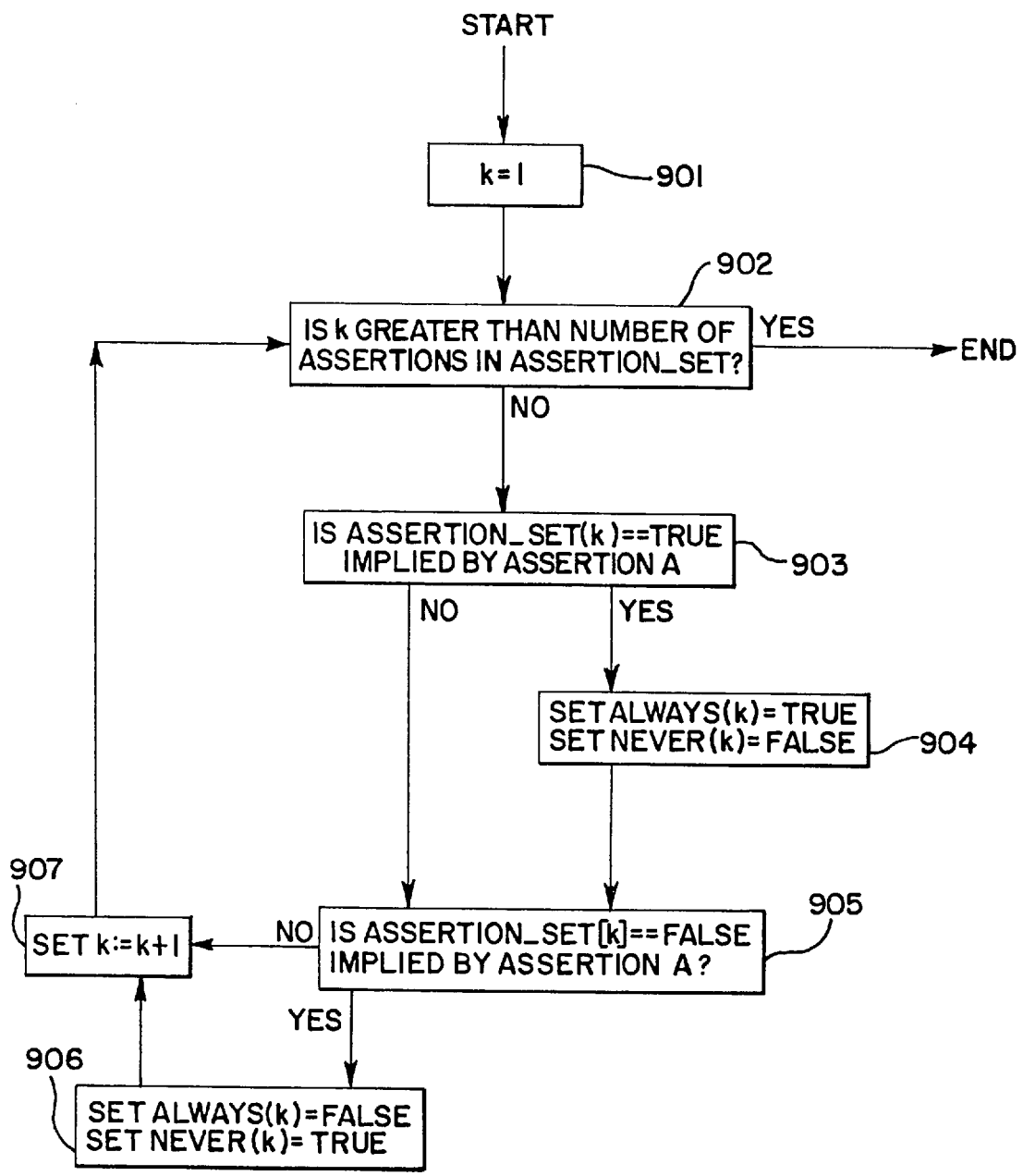
FIG. 9 is a flowchart for process ASSERT_IMPLICATION, which computes effects of assertion A on arrays ALWAYS and NEVER.

(iii) Do 805 process ASSERT_IMPLICATION (FIG. 9). Process ASSERT_IMPLICATION iterates (901,902,907) over the assertions in ASSERTION_SET. If 903 ASSERTION_SET(k)==true is implied by assertion A, then set 904 ALWAYS(k) to true and NEVER(k) to false. If 905 ASSERTION_SET(k)==false is implied by assertion A, then set 906 ALWAYS(k) to false and NEVER(k) to true.

(c) If edge E is a lifetime edge, edge E denotes the creation or destruction of an lvalue EXPR(E). Do 802 process LIFETIME_IMPLICATION (FIG. 12). Process LIFETIME_IMPLICATION sets 1201 TSET to the nodes in the region-forest subtree rooted at NODE(EXPR(E)), sets 1202 VALUE to true, and invokes 1203 process MODIFY_ANALYSIS.

Figure 10:
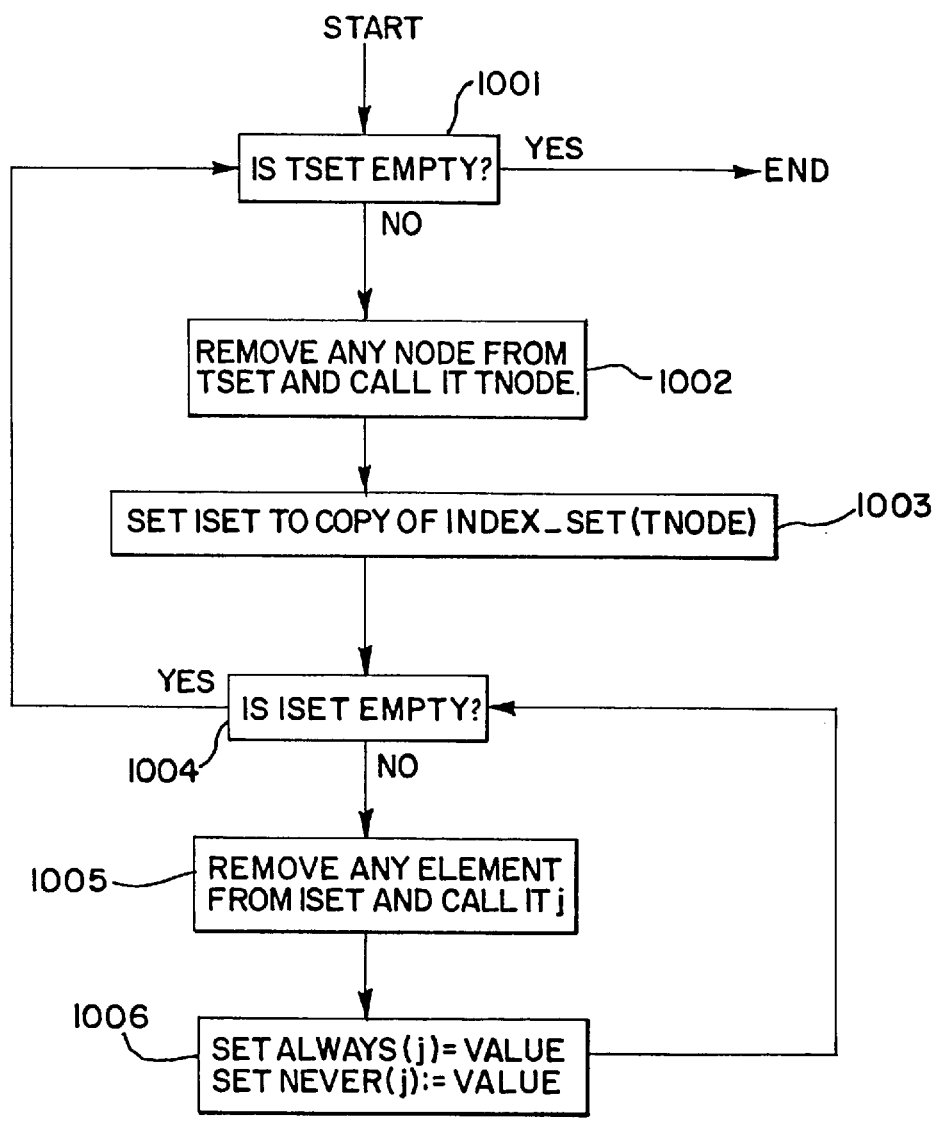
FIG. 10 is a flowchart for process MODIFY_ANALYSIS, which updates arrays ALWAYS and NEVER from information TSET and VALUE.

Process MODIFY_ANALYSIS (FIG. 10) iteratively 1001 removes 1002 nodes from TSET. For each such node (called TNODE), it iterates (1003,1004,1005) over each index j in INDEX_SET(TNODE) and sets both 1006 ALWAYS(j) and NEVER(j) to VALUE.

(d) If edge E is an expression edge, account for its side effects as follows:

(i) For 806 each lvalue L that might be modified by evaluation of EXPR(E), do process STORE_IMPLICATION (FIG. 11). Process STORE_IMPLICATION works by setting 1101 TSET to the nodes in REGION_FOREST that might overlap lvalue L or be aliases of lvalue L. Said process specifically excludes 1102 from consideration nodes in the same tree as NODE(L) that represent lvalues that are disjoint from L. Said process sets 1103 VALUE to false and invokes 1104 process MODIFY_ANALYSIS.

(ii) If 807 EXPR(E) is an assignment of the form L:=R, set 808 assertion A to the assertion L==R and do 809 process ASSERT_IMPLICATION (FIG. 9).

5. Use a monotone dataflow framework to analyze the assertions. Monotone dataflow frameworks are described by Aho et al [1]. For each assertion A, the data-flow analysis framework is:

(a) The set of values to be propagated are pairs of bit arrays (ALWAYS,NEVER) associated with each vertex.

(b) The set of transfer-functions F from values to values are the transfer-functions IMPLICATION(E) described in step 4.

(c) The binary meet operation is bitwise-AND over the respective arrays. that is MEET((A1,N1),(A2,N2))= (A1&A2,N1&N2) where & denotes the bitwise AND operation.

(d) The possible two-tuples (ALWAYS,NEVER) form a lattice in which the top element is a pair of bit-arrays with all elements set to true.

The solutions acquired from the dataflow framework for a vertex V are denoted ALWAYS_FIXPOINT(V) and NEVER_FIXPOINT(V). If ALWAYS_FIXPOINT (V)(k)==true and NEVER_FIXPOINT(V)(k)==false, then the kth assertion in ASSERTION_SET can be assumed to be true when execution reaches vertex V. Similarly, if ALWAYS_FIXPOINT (V)(k)==false and NEVER_FIXPOINT(V)(k)==true, then the kth assertion in ASSERTION_SET can be assumed to be false when execution reaches vertex V.

6. This step is optional and can be omitted at the implementor's discretion. The advantage of this step is that is may simplify expressions in the program. In particular, it may reduce test expressions to constants that allow branches to be replaced by unconditional transfers of control. This step comprises the steps shown in FIG. 13. Iterating (1301,1302,1303) over each expression edge E in the control-flow graph, do the following steps.

(a) Set 1304 V:=TAIL(E) and (b) Set 1305 ALWAYS:=ALWAYS_FIXPOINT(V)(k)

(c) Set 1306 NEVER:=NEVER_FIXPOINT(V)(k)

(d) Set 1307 EXPR(E) to partial evaluation of EXPR(E) in the context of ALWAYS and NEVER.

To partially evaluate an expression P in the context of ALWAYS and NEVER means to algebraically simplify it where possible, given the following assumptions.
  (a) If ALWAYS(k)==true and NEVER(k)==false for some value of k, then assertion ASSERTION_SET (k) can be assumed to be true.
  (b) If ALWAYS(k)==false and NEVER(k)==true for some value of k, then assertion ASSERTION_SET (k) can be assumed to be false.

Note in particular that if an assertion A of the form P==X or X==P is true, then expression P can be replaced by X. It is usually advantageous to do so if X is simpler to evaluate than P. The exact method of partial evaluation is not part of the invention, and a variety of techniques should be obvious to those skilled in the art. For step 6, the novelty of the invention is the flow analysis of lvalues used to compute ALWAYS and NEVER.

Figure 14:
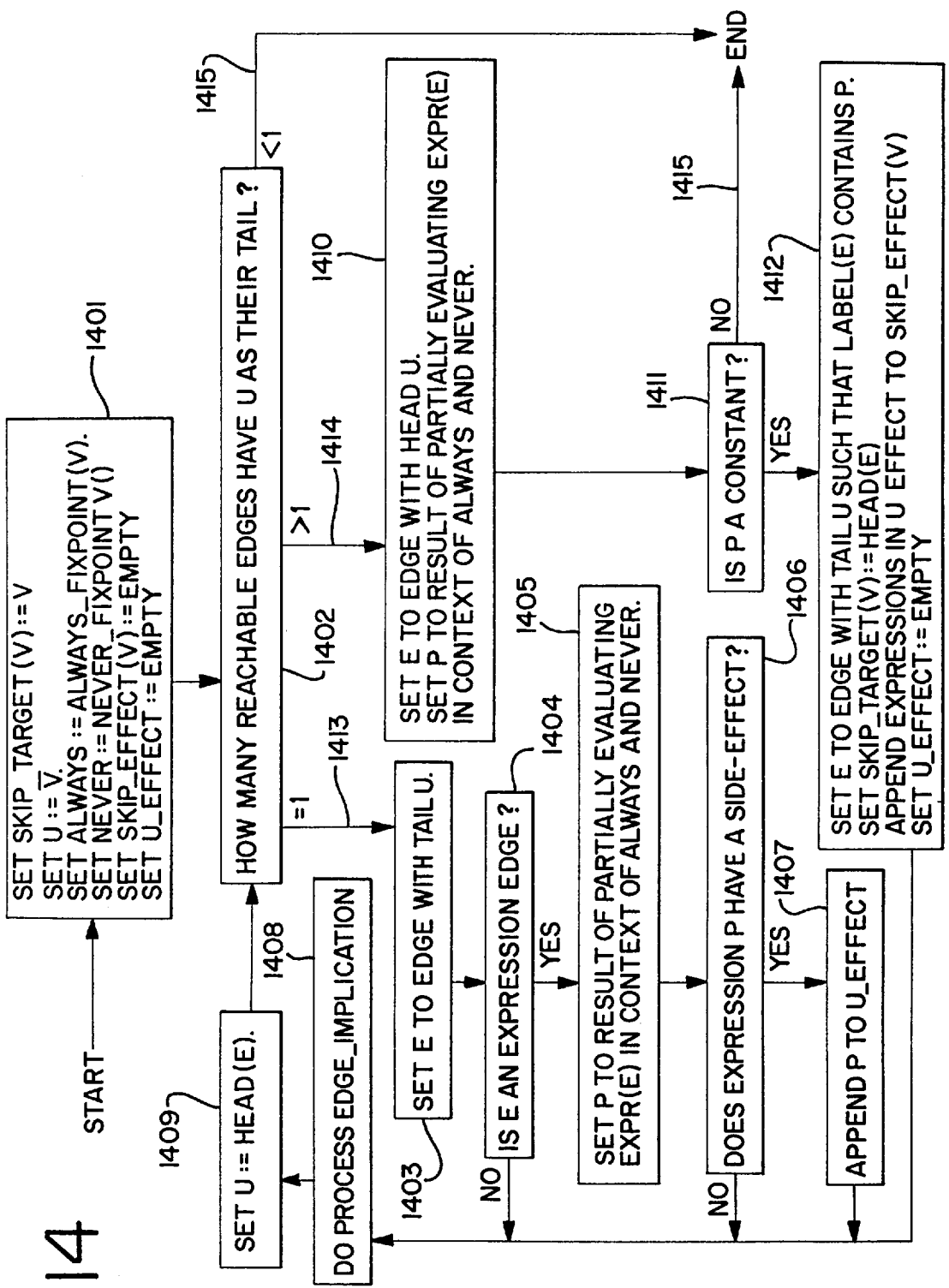
FIG. 14 is a flowchart for process SKIP_PATH, which predicts execution from vertex V and recording side-effects for the predicted path.

7. Find branches that can be redirected and compute how far they can be redirected. Do this by applying the process SKIP_PATH shown in FIG. 14 to each vertex V in set TRAMPOLINE. Said process initializes 1401 the following:
   SKIP_TARGET:=V
   U:=V
   ALWAYS:=ALWAYS_FIXPOINT(V)
   NEVER:=NEVER_FIXPOINT(V)
   SKIP_EFFECT(V):=empty
   U_EFFECT(U):=empty Said process counts 1402 the edges that have U as their tail. There are three cases to consider.
   (a) If there is exactly one such edge, then 1413 edge E is set 1403 to said edge. If 1404 E is an expression edge, then the expression is partially evaluated 1405 in the context of ALWAYS and NEVER, and the resulting expression is called P. If 1406 expression P has side effects, then it is appended 1407 to U_EFFECT. Effects of edge E on the ALWAYS and NEVER are computed 1408 by running process EDG_IMPLICATION. Vertex U is then advanced 1409 to the head of edge E.
   (b) If there is more than one edge, then 1414 E is set to EXPR(E) and P is set to the partial evaluation of E in the context of ALWAYS and NEVER 1410. If 1411 the resulting expression is not a constant, then 1415 process SKIP_EFFECT ends for vertex V. Otherwise 1416, the branch has been predicted and the following variables are set 1412:
      E is set to the predicted edge, which is the edge with tail U such that LABEL(E) contains P.
      SKIP_TARGET(V) is set to the end of the predicted path so far, which is the head of E.
      The expressions in U_EFFECT are appended to SKIP_EFFECT(V), so that SKIP_EFFECT(V) contains the side effects encountered along the predicted path so far.
      U_EFFECT is set to empty.
   Then the process goes to step 1408 to continue.
   (c) If there are no such edges, then 1415 there is nothing more to predict and process SKIP_PATH ends for vertex V.

Figure 15:
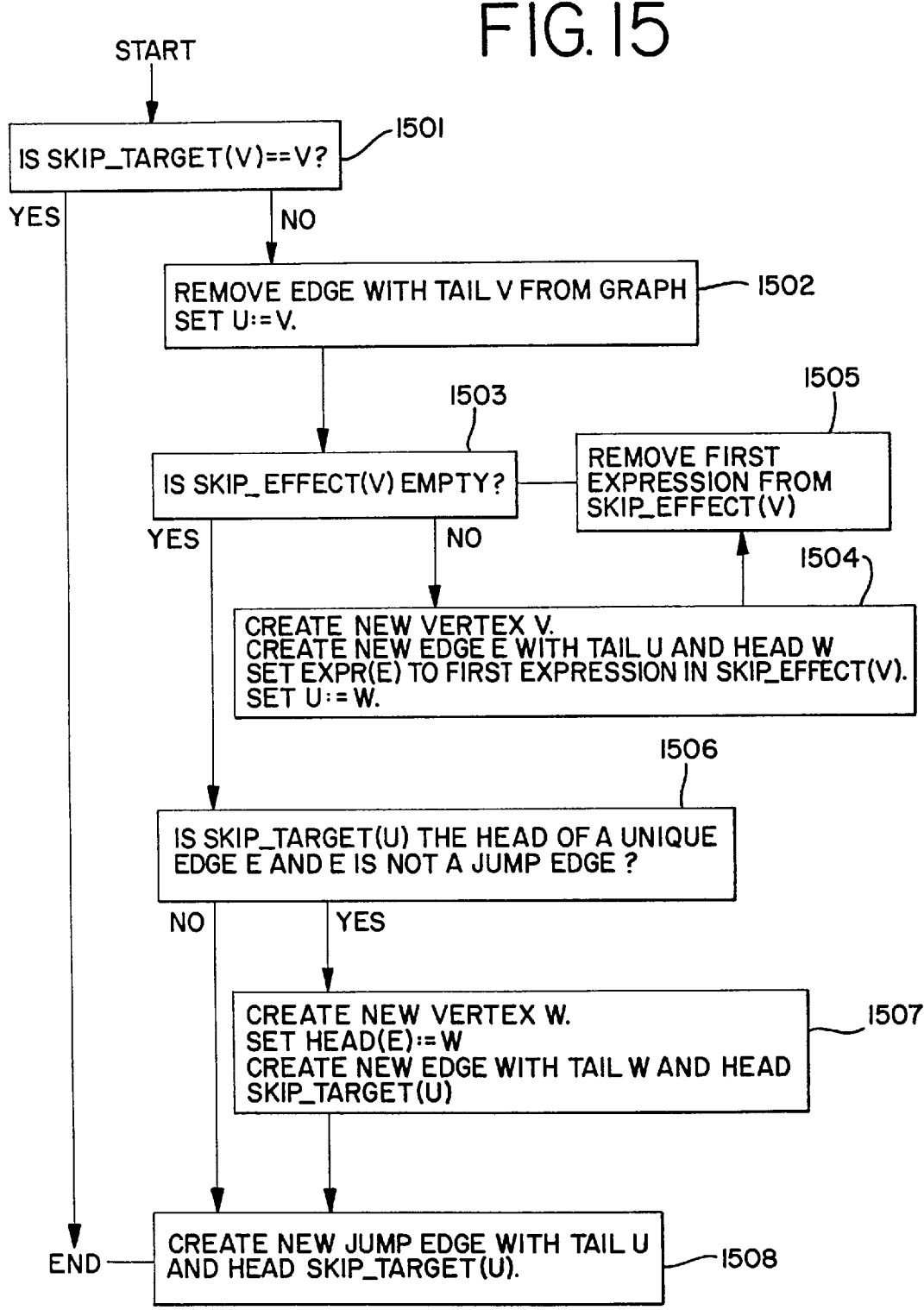
FIG. 15 is a flowchart for the process of redirecting control-flow from a trampoline point V.

8. Redirect flow-control by applying the process shown in FIG. 15 to each vertex V in set TRAMPOLINE. This process examines 1501 SKIP_TARGET(V), and if not equal to V, removes 1502 the edge with tail V and builds (a new path of edges from V to SKIP_TARGET (V) that duplicate any side effects that would have occurred in the old path from V to SKIP_TARGET(V) (1503,1504,1505). Expressions must be removed 1502 from SKIP_EFFECT in the same order that they were added. Adding 1508 the last edge of the path creates a new merge point. Steps 1506 and 1507 ensure that the merge point is always the head of a jump edge.

9. Remove unreachable code by removing unreachable edges from the control-flow graph. Step 9 is optional and can be omitted at the implementors discretion. The step is advantageous because when applied after the previous steps, it removes a branch if the previous steps have succeeded in redirecting all execution paths around said branch.

10. Apply the following transformations to the program:
    (a) Forward-substitute definitions.
    (b) Remove dead stores.

Methods of performing each of these steps are well known to those skilled in the art. Step 10 is optional and can be omitted at the implementors discretion. Said step is advantageous because when applied after the previous steps, it sometimes removes "flag" variables used for controlling branches.

The following explanation traces through the steps performed by the invention to on the control-flow graph in shown in FIG. 16B, which represents the C program fragment in FIG. 16A. Step 1 sets TRAMPOLINE to empty and adds vertices v3, v4, v9, and v10 to TRAMPOLINE. Step 2 adds following assertions:

ASSERTION_SET(1)=="p->a<p->c"
ASSERTION_SET(2)=="x==42"
ASSERTION_SET(3)=="p->b==x"

Figure 18:
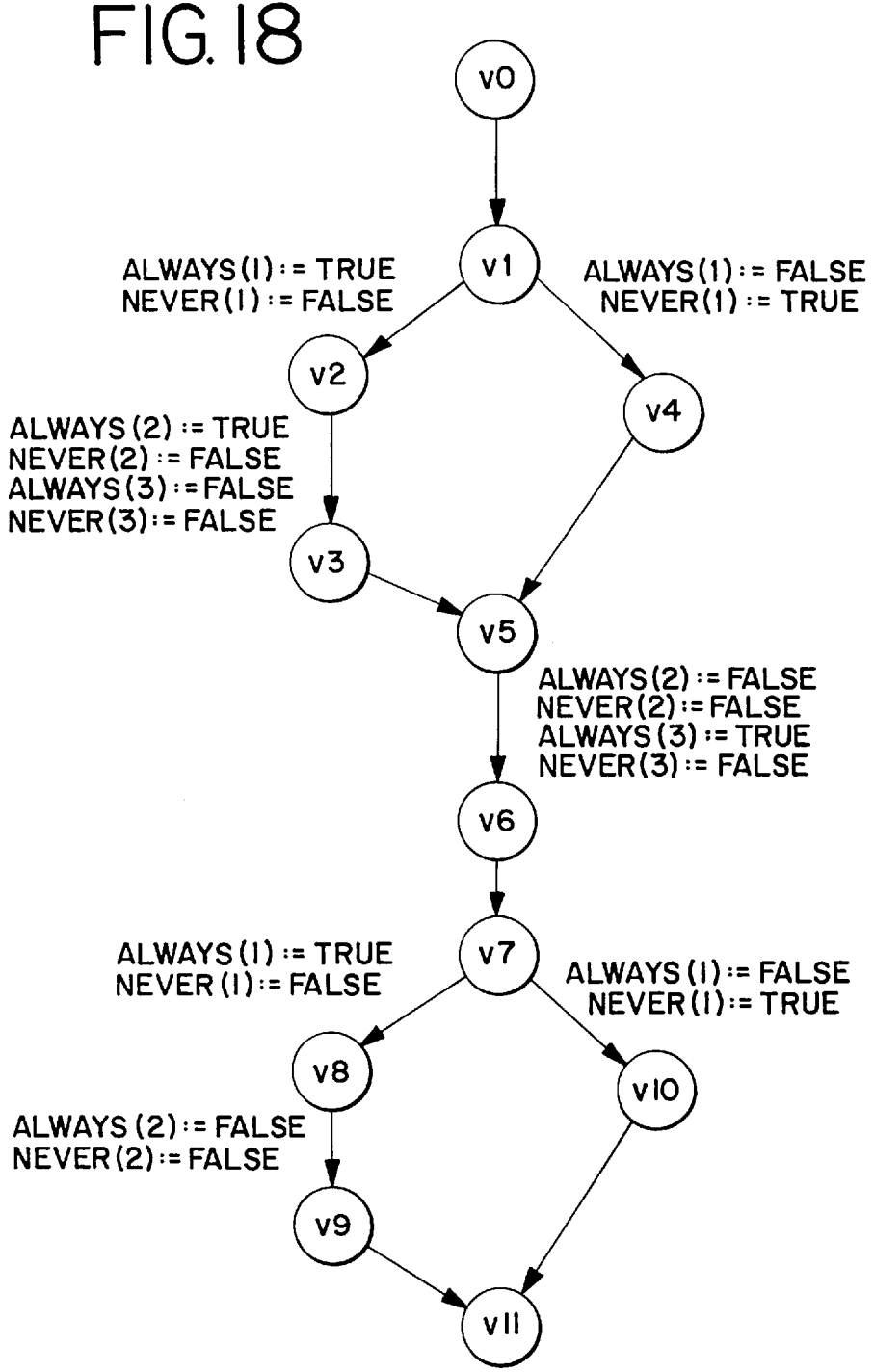
FIG. 18 shows the transfer functions for the example in FIG. 16.
Figure 20:
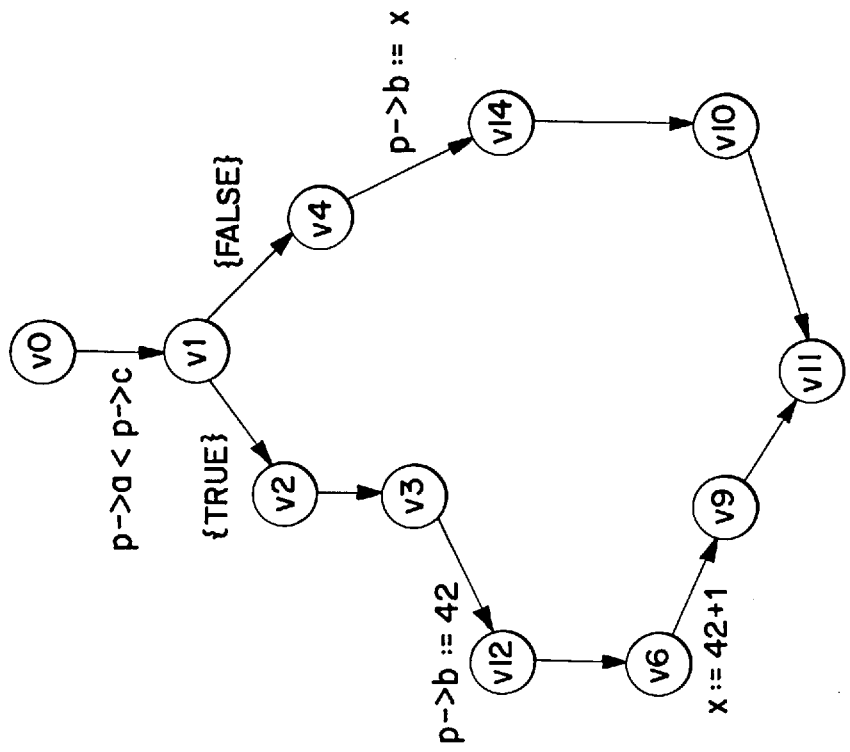
FIG. 20 shows the control-flow graph from FIG. 19 after unreachable code has been removed.
Figure 19:
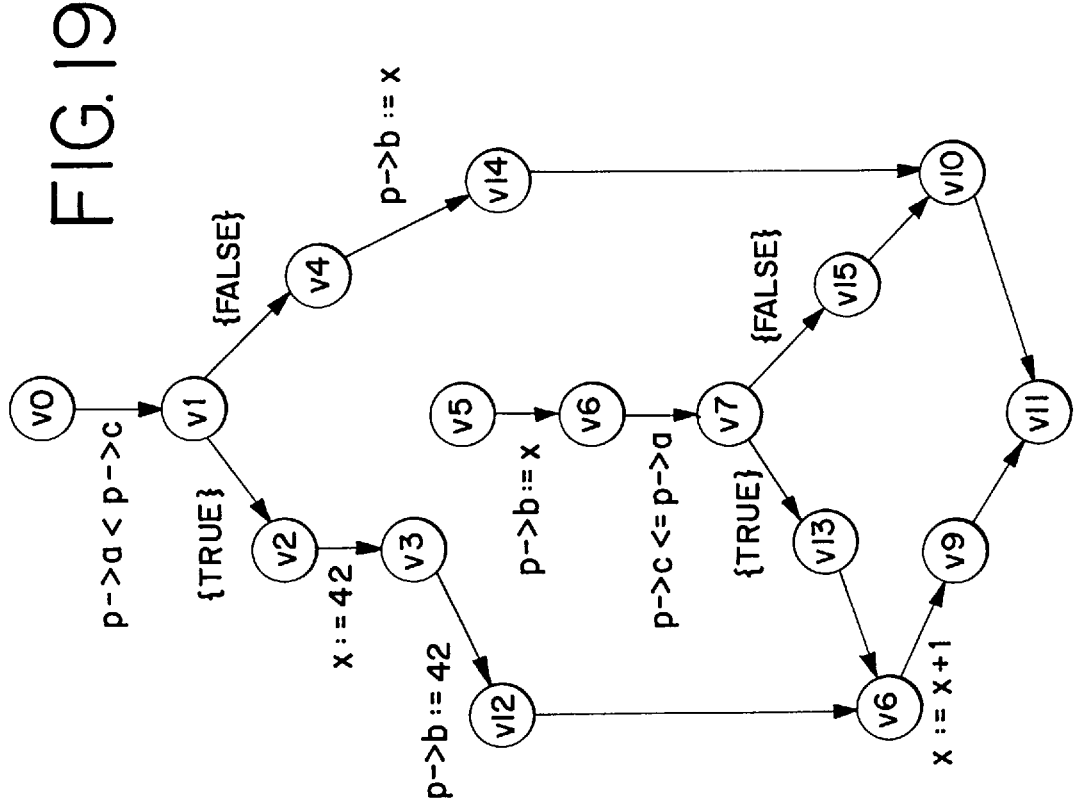
FIG. 19 shows the control-flow graph from FIG. 16 after control-flow has been redirected.

The order in which the assertions are added is irrelevant. For sake of this example, it is assumed that the assertions are added in the order stated above. Step 3 constructs the region-forest shown in FIG. 17. Each node in the tree is annotated with the lvalue to which it corresponds and the value of INDEX_SET for that node. For example, since the support of ASSERTION_SET(1) is the set of lvalues {p, [p@a],[p@c]}, the index 1 is in the INDEX_SET for the nodes corresponding to p, [p@a], and [p@c]. Step 4 constructs the transfer functions for each edge in the control-flow graph. The net effect of each transfer function on ALWAYS and NEVER is shown in FIG. 18. Step 5 solves the flow problems. Step 6 does not change any expressions in the example. Step 7 predicts non-empty paths from v3 and v4. Furthermore, when predicting the path from v3, the partial evaluation of p->b:=x simplifies it to p->b:=42, ALWAYS(2)==TRUE and NEVER(2)==FALSE when the path predicted from v3 reaches the edge with tail v4 and head v5. When Step 7 finishes:

SKIP_TARGET(v3)==v7 and SKIP_EFFECT(v3)== "p->b:=42".
SKIP_TARGET(v4)==v9 and SKIP_EFFECT(v4)== "p->b:=x".
SKIP_TARGET(v9)==v9 and SKIP_EFFECT(v9)== empty
SKIP_TARGET(v10)==v10 and SKIP_EFFECT(v10)= =empty Step 8 transforms the control-flow graph by removing edges v3→v5 and v4→v5 and adding new paths, yielding the control-graph shown in FIG. 19. Step 9 removes vertices v5, v6, v7, v13, and v15 and edges incident to them. Step (10)(a) forwards the definition $\chi:=42$ into the expression $\chi:=\chi+1$, thus changing it to $\chi:=42+1$. Step (10)(b) removes the unused definition $\chi:=42$. The final result is shown in FIG. 20.

The prior art of Sakharov does not transform the example above for three reasons. First, his method considers only assertions concerning equality, and does not consider an inequality such as p->a<p->c. Second, his method does not consider lvalues that are not scalar variables, and thus does not apply to assertions such as p->a<p->c that involve pointers. Third, his method does not attempt to predict execution past side-effects. In the example, it is essential to predict execution from v3 and v4 past the side effect p->b:=x to reach the predictable branch.

The prior art of Mueller and Whalley does not transform the example above for two reasons. First, their method concerns only branches within loops. Second, their method is limited to tests involving scalar variables only.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of this invention.

I claim:

1. A method operable within an optimizing compiler for redirecting control flow of a program, comprising the steps of:
   (a) finding points in said program where control flow merges and subsequently branches, said points being known as trampoline points;
   (b) inspecting said program to generate a set of assertions;
   (c) performing flow analysis on said assertions;
   (d) for each trampoline point found, predicting program execution from said trampoline point by
      (i) examining successive actions after said trampoline point;
      (ii) using the flow analysis of said assertions to predict the result of each branching action; and
      (iii) incrementally extending said flow analysis to account for the effect of each side-effecting action along the predicted path until an unpredictable branch is encountered; and
   (e) modifying said program when execution of one or more branches is predicted after a trampoline point such that program execution
      (i) jumps from said trampoline point to a predicted point; and
      (ii) produces side effects equivalent to those that would have occurred if said jump were not inserted.

2. The invention of claim 1 wherein said assertions are chosen by inspecting said program and generating at least one assertion corresponding to
   (a) each relational test in said program; and
   (b) each assignment in said program.

3. The invention of claim 1, further comprising the subsequent steps of:
   (a) forward substituting definitions of lvalues; and
   (b) eliminating dead stores to lvalues, whereby some flag variables can be removed from a program.

4. The invention of claim 1, further comprising the subsequent step of: eliminating unreachable code, whereby redundant branches are eliminated from a program.

5. A method of flow analysis for assertions, comprising the steps of:
   (a) building a forest of trees, called a region-forest, in which said trees represent scalar and aggregate lvalues, and the hierarchical containment of lvalues therein for all lvalues that support an assertion;
   (b) assigning a unique index to each assertion;
   (c) assigning an index set to each node in said region-forest; and
   (d) using said index set when analyzing the effect of modifying, creating, or destroying an lvalue corresponding to a node in said region-forest to determine which assertions might be affected.

6. The invention of claim 5, further comprising the subsequent step of: replacing expressions by partial evaluations of said expressions, where said partial evaluations are based on said flow analysis of assertions.

7. The invention of claim 5, further comprising the improvement of: when analyzing the target of a store or modify operation, removing from consideration any node such that within said region-forest, said node is within the tree that contains a node corresponding to said target, but the lvalue represented by said node is disjoint from said target.

* * * * *